June 28, 1966     W. T. HARPSTER     3,258,771
RADAR DECEPTION JAMMER
Filed Dec. 30, 1964
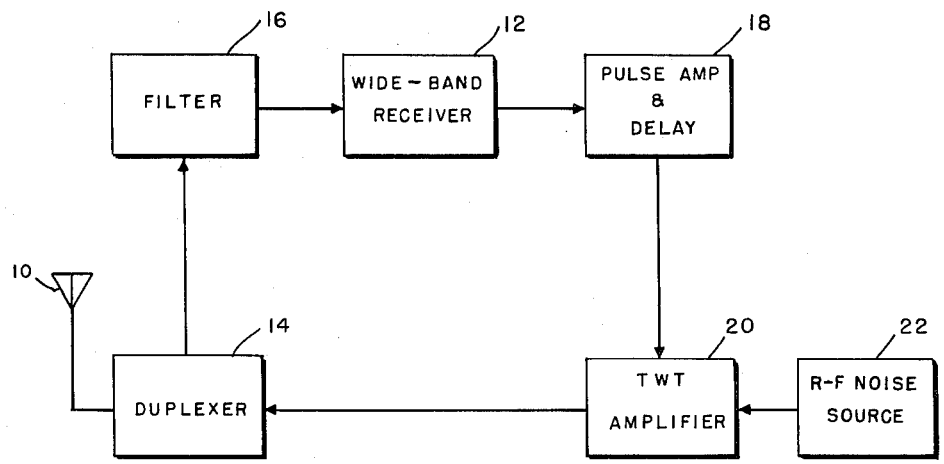
INVENTOR,
WARREN T. HARPSTER
BY Harry M. Saraporrty,
Edward J. Kelly, Herbert Berl
& Julian C. Keppler    ATTORNEYS

3,258,771
RADAR DECEPTION JAMMER

Warren T. Harpster, Sudbury, Mass., assignor, by direct and mesne assignments, to the United States of America as represented by the Secretary of the Army
Filed Dec. 30, 1964, Ser. No. 422,473
4 Claims. (Cl. 343—18)

This invention relates to radar system and more particularly to a radar deception jammer.

It is frequently desirable to deceive and confuse a functioning radar system, that is, to provide ambiguous signals which the radar system is incapable of discriminating from true target indications. Such radar jamming or countermeasure radar systems usually require complicated circuitry to first determine the frequency and pulse width of the radar to be jammed, and then to adjust the frequency of the jammer transmitter before it is energized.

It is an object of the present invention to provide an improved radar deception jamming system.

It is another object of the present invention to provide an improved radar deception jamming system capable of providing wide-band frequency jamming signals without determining the frequency of the received pulse.

In accordance with the present invention there is provided a radar deception jammer which includes an antenna for detecting radar pulse signals and means responsive to the output of the antenna for producing a video output pulse for each radar pulse signal detected. Also included is an RF noise source and a normally quiescent TWT amplifier. The video output pulses are applied as gating pulses to the TWT amplifier and the RF noise is applied as the RF signal to the TWT amplifier whose output is applied to said antenna as the jamming signal to be transmitted. The TWT amplifier is gated on only by the video output pulses so that amplified RF noise is produced at the output of the TWT amplifier only for the duration of the video pulses which correspond to the pulse widths of the detected radar pulse signals. The amplified RF noise is then transmitted as the jamming signal. A duplexer is provided in the usual manner to isolate received and transmitted signals.

For a better understanding of the invention, together with other and further objects thereof, reference is made to the drawing which is a schematic block diagram of the radar deception jammer.

Referring now to the drawing, a receiving antenna 10 is adapted to detect an incoming pulsed radar signal which is coupled to a wide-band receiver 12 through duplexer 14 and filter 16. Duplexer 14 is of conventional design and filter 16 is designed to pass the entire frequency band of interest. Wide-band receiver 12 is preferably of the crystal video type and is adapted to detect the signals passed by filter 16. As shown, the detected video output from receiver 12 is applied to a pulse amplifier and delay circuit 18. The delay circuit of stage 18 may be adjustable to provide prescribed delays of respective video output pulses with respect to associated input pulses to simulate discrete distances of radar target echoes. The output of pulse amplifier and delay circuit 18 is applied as a gating pulse of a normally quiescent or cut-off travelling-wave tube (TWT) amplifier 20. An RF noise energy source 22 adapted to generate noise power over the frequency band of interest has its output coupled to the travelling wave tube amplifier 20. The TWT amplifier 20 is of conventional construction and as such includes an axial electron-beam generating element and an axial slow-wave structure which surrounds the electron beam and is provided with the usual input and output signal coupling means. The RF noise energy source 22 is applied to the slow-wave structure and the video pulses from amplifier and delay circuit 18 may be applied as gating pulses to the electron-beam generating element of TWT amplifier 20. By this arrangement, the amplified noise power is produced at the output of the travelling-wave tube amplifier 20 only when it is gated on by the pulses derived from pulse amplifier and delay circuit 18. As shown, the amplified RF noise power output of travelling-wave tube 20 is applied as the transmitter energy through duplexer 14 to antenna 10.

In operation, the system shown in the drawing will transmit one pulse of broad-band noise energy for each radar pulse received. The transmitted pulse will thus have the same pulse width as the received pulse, and because broad-band RF noise is used as the carrier, the transmitted signal will be capable of being received by any receiver in this frequency band. Thus with this system it is not necessary to determine the frequency of the received pulse and to adjust the frequency of the transmitter before the jammer is energized as heretofore required.

While there has been described what is at present considered to be the preferred embodiment of this invention, it will be obvious to those skilled in the art that various changes and modifications may be made therein without departing from the invention, and it is therefore aimed in the appended claims to cover all such changes and modifications as fall within the true spirit and scope of the invention.

What is claimed is:

1. A radar deception jammer comprising
   an antenna,
   means responsive to the output of said antenna for producing a video output pulse for each radar pulse signal detected by said antenna,
   an RF noise source,
   and a normally quiescent TWT amplifier having its slow-wave structure responsive to the output of said RF noise source and also responsive to said video output pulses such that amplified RF noise is produced at the output of said TWT amplifier only for the duration of said video pulses, the output of said TWT amplifier being coupled to said antenna whereby said amplified RF noise is transmitted.

2. The radar jammer in accordance with claim 1 wherein said video pulse producing means comprises a wide-band crystal video receiver and a pulse amplifier.

3. The radar jammer in accordance with claim 1 wherein said pulse amplifier further includes means for delaying the amplified video output pulses with respect to associated antenna detected signals.

4. A radar deception jammer adapted to detect radar pulse signals and to transmit jamming RF noise pulses of the same pulse width as said detected radar pulse signals comprising,
   an antenna for detecting said radar pulse signals,
   a prescribed frequency band-pass filter responsive to said detected radar pulse signals, a wide-band receiver of the crystal video type responsive to the output of said filter for producing a respective video output pulse of the same pulse width as respective detected radar pulse signals passed by said filter, a pulse amplifier responsive to said video output pulses and including a delay producing means for delaying the amplified video pulses with respect to associated detected radar pulse signals, an RF noise source, and a normally quiescent TWT amplifier having its slow-wave structure responsive to the output of said RF noise source and also responsive to said delayed amplified video pulses such that amplified RF noise is produced at the output of said TWT amplifier only for the duration of the pulse widths of said amplified video output pulses, the output of said TWT amplifier being coupled to said antenna whereby said amplified pulsed RF noise is transmitted.

No references cited.

CHESTER L. JUSTUS, *Primary Examiner.*

P. M. HINDERSTEIN, *Assistant Examiner.*